United States Patent
Munoz et al.

(10) Patent No.: US 10,182,068 B2
(45) Date of Patent: Jan. 15, 2019

(54) DETERMINE VULNERABILITY USING RUNTIME AGENT AND NETWORK SNIFFER

(71) Applicant: HEWLETT PACKARD ENTERPRISE DEVELOPMENT LP, Houston, TX (US)

(72) Inventors: Alvaro Munoz, Las Rozas (ES); Sasi Siddharth Muthurajan, Alpharetta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 213 days.

(21) Appl. No.: 15/500,529

(22) PCT Filed: Nov. 26, 2014

(86) PCT No.: PCT/US2014/067658
§ 371 (c)(1),
(2) Date: Jan. 31, 2017

(87) PCT Pub. No.: WO2016/085499
PCT Pub. Date: Jun. 2, 2016

(65) Prior Publication Data
US 2017/0223043 A1    Aug. 3, 2017

(51) Int. Cl.
*G06F 21/00*    (2013.01)
*H04L 29/06*    (2006.01)
*H04L 12/26*    (2006.01)
*G06F 21/55*    (2013.01)
*G06F 21/57*    (2013.01)

(52) U.S. Cl.
CPC ........ *H04L 63/1433* (2013.01); *G06F 21/552* (2013.01); *G06F 21/577* (2013.01); *H04L 43/12* (2013.01); *H04L 63/145* (2013.01); *H04L 63/1416* (2013.01); *H04L 63/1483* (2013.01); *H04L 63/20* (2013.01); *G06F 21/556* (2013.01); *G06F 2221/033* (2013.01)

(58) Field of Classification Search
CPC . H04L 63/1433; H04L 63/1483; H04L 63/20; H04L 63/145; H04L 63/1416; H04L 43/12; G06F 21/577; G06F 21/552; G06F 2221/033; G06F 21/556
See application file for complete search history.

(56) References Cited

U.S. PATENT DOCUMENTS 7,237,265 B2 *  6/2007  Reshef ................. G06F 21/554
                                                              709/203
7,761,918 B2    7/2010  Gula et al.
(Continued)

FOREIGN PATENT DOCUMENTS

CN    1900943 A     1/2007
CN    101465764 A   6/2009

OTHER PUBLICATIONS

Balduzzi, M., "Automated Detection of HPP Vulnerabilities in Web Applications", Jul. 12, 2011, BlackHat USA 2011, 19 pages.

*Primary Examiner* — Lisa C Lewis

(57) ABSTRACT

Example embodiments disclosed herein relate to determination of vulnerability of an application under test using a runtime agent and network sniffer during a security test. A runtime agent monitors execution of an application under test. A network sniffer is used to identify a probe value for determination of the vulnerability.

15 Claims, 4 Drawing Sheets

(56) References Cited

U.S. PATENT DOCUMENTS

| | | |
|---|---|---|
| 7,849,448 B2 | 12/2010 | Yunus et al. |
| 2008/0271151 A1 | 10/2008 | Blake et al. |
| 2009/0100518 A1* | 4/2009 | Overcash .............. G06F 21/552 726/22 |
| 2012/0174075 A1* | 7/2012 | Carteri ................ G06F 11/3688 717/127 |
| 2013/0054792 A1 | 2/2013 | Sharaf |
| 2013/0191920 A1* | 7/2013 | Amit .................... H04L 63/166 726/25 |
| 2014/0020093 A1 | 1/2014 | Schulte |
| 2014/0207935 A1 | 7/2014 | Gopshtein et al. |
| 2014/0245460 A1* | 8/2014 | Sum ...................... G06F 21/577 726/28 |
| 2017/0220449 A1* | 8/2017 | Munoz Sanchez ......................... G06F 11/3636 |

* cited by examiner

DETERMINE VULNERABILITY USING RUNTIME AGENT AND NETWORK SNIFFER

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the Uniform Resource Locators (URLs) where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
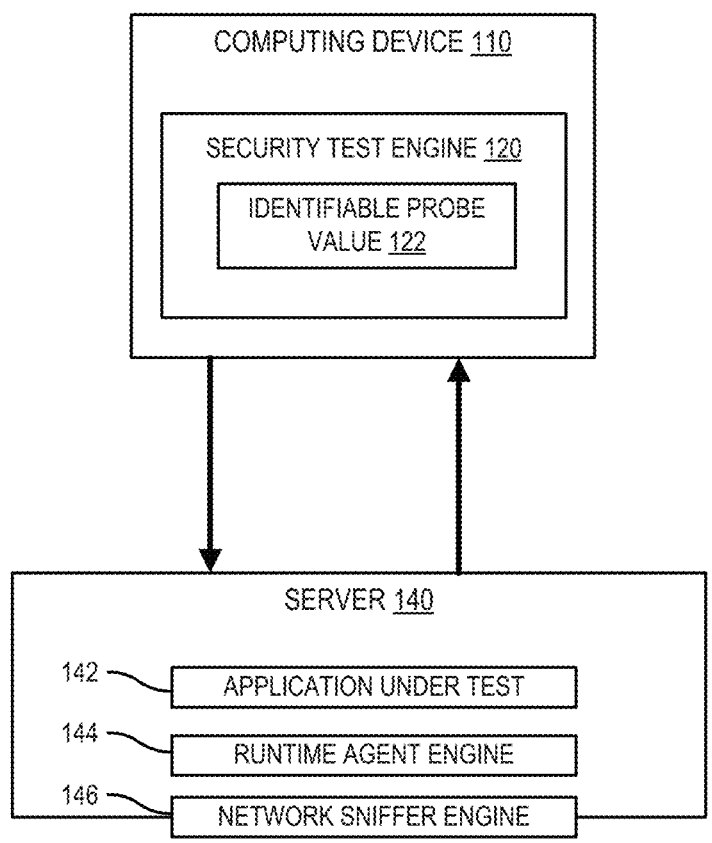
FIG. 1 is a block diagram of a computing system capable of determining a potential security vulnerability, according to one example.

A web application vulnerability scanner is an approach for identifying vulnerabilities in a web application. A scanner starts by crawling the application under test (AUT) to identify the attack surface. A runtime agent can be installed on the application server to assist with performing a security test.

As described herein, a software program referred to herein as a runtime agent is used to watch the internal operations performed by the AUT. The software can be executed by hardware. The runtime agent enables the scanner to determine the operation of the AUT and how it behaves in response to attacks. The runtime agent also enables the scanner to determine the behavior of the AUT in response to normal application requests, which the scanner may use to determine what types of attacks to send. The scanner continues to deliver attacks to the AUT, and the scanner receives knowledge of the internal workings of the AUT from the runtime agent. In this way, the scanner can find more vulnerabilities and produce better vulnerability reports, thereby providing a more comprehensive and detailed software security test of web-based applications.

Detecting security sensitive events that occur on the server-side of an AUT is a challenging task. This can be because a consequence of the event is not reflected in the response. Black box scanners rely on the requests sent to the server/AUT and the response the scanners receive from the server/AUT in order to infer vulnerabilities in the running application modeled as a black box.

Many applications today deployed in an enterprise are comprised of multiple layers and components and the normally interact with a wide variety of other servers deployed in the internal network such as mail servers, databases, Lightweight Directory Access Protocol (LDAP) servers, internal web services, etc. These other servers may be susceptible to server-side request forgery attacks. With server-side request forgery attacks, an attacker can leverage how the application handles user controlled data to craft and send requests to another internal server.

Detecting if an attacker can influence how these connections are made or detecting whether the attacker can hijack the connections and point the connections to arbitrary servers in the internal or external network is useful to prevent these servers from being compromised. Web applications communicate with internal servers to do their tasks. A challenge for application security is to detect when an external attacker can influence, modify, or completely hijack these connections.

In the black box testing scenario, since the consequence of such attacks is unknown to the client, it is difficult to validate the success of an attack. Static analysis and runtime analysis are approaches to detect vulnerabilities as well. However, both static and runtime analysis need to know in advance what function application programming interfaces (APIs) can be used to set up a connection or send requests to different servers. This can be time consuming because individual identification of a large number of APIs that are used for these purposes may be needed. This would be followed by the manual task of writing rules for the static or runtime platforms to detect these calls.

Also, in some cases, it is not even possible to correctly detect the communication streams. For example, if the application opens a raw socket connection with a remote peer, it will not be possible for a static analyzer to detect the exact type of communication.

Hence, it is advantageous to be able to identify how (e.g., which protocols) and when the AUT interacts with other components in order to identify whether an attacker can take control of those connections (e.g., server-side request forgery) or to gain insight into the contents of the messages being transmitted (e.g., find out whether an email is sent to the user with its password in the clear). While analysis of each API is possible, it is time consuming, cumbersome, and not generic enough to support all possible cases.

Accordingly, various embodiments herein describe a generic way of analyzing such behavior. Embodiments used herein use a security test such as a dynamic scanner, a runtime agent installed within the application server and a network sniffer to track network connections coming in and out of the application server. The dynamic scanner can identify information as it acts as the client and submits uniquely identifiable probes to the server. The runtime agent within the server tracks these probes and informs the network sniffer of their current values.

The network sniffer is used to monitor incoming and outgoing network connections and inspect them for the known probe values provided by the runtime agent. If the network sniffer (e.g., via network packet inspection) finds evidence of the probe values being used in the Uniform Resource Locator (URL) or message body, it will inform the runtime agent to convey that information to the security test. The security test can list this as a possible vulnerability. The security test can also craft new packets to try and compromise the server by, for example, trying to hijack the connection (Server-side request forgery) or process and analyze the contents of the message in order to detect security sensitive details like emails sent by "reset or password forgotten features," backend web service connections, RESTful operations, etc. Network sniffing functionality can be implemented in software executed by hardware or as hardware. Further, network sniffing functionality may be implemented on the server or as a separate device.

With these approaches, network traffic originated from the application can be used to identify which connections may be controlled by an attacker. Further, the examples discussed herein can be used to identify how an attacker payload is reflected in a connection destination or data being transmitted. Moreover, it can communicate these details back to a security test to initiate a second order scan into various backend services.

While one aim of this approach is to identify insecure communications that can be manipulated or hijacked by attackers, these approaches can also be used to check plain/encrypted database connections or other protocols used in a legitimate way but where an attacker could have injected a malicious payload. Furthermore, by inspecting the body of outgoing communication streams from the application, it would be possible to check for sensitive information that is leaked intentionally or unintentionally.

In a specific example, Server Side Request Forgery (SSRF) can be a vulnerability to be detected. For the purposes of this example, eXtensible Markup Language (XML) External Entity Injection (XXE) is used. An XXE vulnerability is that if a resource is declared as an entity in an XML document, then the XML processor will expand this entity by reading that resource without validating the scope of its access. For example:

```
<?xml encoding='utf-8' ?>
<!DOCTYPE test [<!ENTITY ent 'test'>]>
<tag>&ent;</tag>
```

In the above example, the XML entity "&ent;" is replaced with the text declared in the entity declaration—"test". In general terms, an entity can be viewed as a constant string that gets replaced in the XML document. Below is another example that shows XML being used in another way.

```
<?xml encoding='utf-8' ?>
<!DOCTYPE test [<!ENTITY ent SYSTEM '/etc/passwd'>]>
<tag>&ent;</tag>
```

In the above example, the entity points to a file in the computer. In this case, since it is declared as "SYSTEM", the entity gets replaced with the actual contents of the declared file. Now, in the case of SSRF, the same concept can be used to refer to a resource outside the machine, e.g., a URL.

```
<?xml encoding='utf-8' ?>
<!DOCTYPE test [<!ENTITY ent SYSTEM 'http://[mail.example]'>]>
<tag>&ent;</tag>
```

In this case, when the XML entities get expanded, the declared URL is reached out to. The steps of an SSRF attack could start with a POST request containing an XML in its body. Then, a malicious attacker such as a client or user modifies the XML to include External Entity that points to an internal server. When the XML is processed by a vulnerable application, it does not validate the entity, and hence, requests the URL provided by the attacker. The results may be directly returned in the response or other consequences could happen due to the attack. Consequences can depend on the AUT itself. Since the consequence of the attack is unreliable, it can be beneficial to use a runtime agent and the network sniffer as discussed herein. Such an attack can be used to scan the internal private network for the presence of or absence of various resources. In some cases, it may also be used to extract sensitive data out of the network. This can be possible because the vulnerable AUT initiates the second connection. Since the vulnerable AUT is located within the internal network, generally behind its firewall, the attacker can inherit network connectivity applied to the vulnerable application.

FIG. 1 is a block diagram of a computing system capable of determining a potential security vulnerability, according to one example. Computing device 110 and server 140 include components that can be utilized to perform a security test on an application under test 142. The respective devices 110, 140 may be a notebook computer, a desktop computer, a server, a workstation, or any other computing device capable of performing the recited functionality. In certain examples, a server 140 is a system that can respond to requests over a computer network to provide or help provide a network service. In certain examples, the computing device 110 can include a security test engine 120 (e.g., a scanner), which may be capable of conducting a security test on the AUT 142. The server 140 may include the application under test 142, a runtime agent engine 144, and a network sniffer engine 146. Communications between the computing device 110 and the server 140 may be conducted using a request-response protocol such as the Hyper-Text Transfer Protocol (HTTP).

The security test engine 120 can perform security tests on the AUT, for example, a scan. The security test engine 120 is responsible for crawling the application and fuzzing parameters to look for vulnerabilities in the AUT 142. When a runtime agent engine 144 is installed on the server 140, the security test engine 120 sends additional instructions to the runtime agent engine 144 so that the runtime agent engine 144 can perform its functions.

The security test engine 120 sends special values called identifiable probe values (IPV) as uniquely identifiable strings that the runtime agent engine 144 will be able to easily track, recognize, and share with the network sniffer engine 146. These can be sent as a notification as further described in FIG. 2. Moreover, in some examples, IPVs can be known values that are identifiable based on a pattern. As such, in some examples, the IPVs can be based on De Bruijn patterns. As such, a substring of a probe can be identified as part of a complete probe. Further, an offset of the portion captured in a packet can be inferred.

Each request containing these unique IPVs can be followed by a trace request to the runtime agent engine 144 requesting for information that was collected by the runtime agent engine 144 during the execution of the application request. The information collected can then be stored in a storage associated with the security test engine 120 so that it can be used later.

The security test engine 120 sends a request notification with a note to observe a given IPV. Then the runtime agent engine 144 can communicate the IPV(s) to the network sniffer engine 146 for packet inspection and matching.

The network sniffer engine 146 will sniff and analyze the communication streams or traffic from the AUT 142 and inspect those packets entering or leaving the application for the known IPV(s) sent by the security test engine 120.

If the network sniffer engine 146 detects a packet including the provided IPV(s) in the URL or content, it will pass or provide information about the packet back to the runtime agent engine 144. The information can include an indication that the IPV was identified. In some examples, the whole packet can be provided back to the runtime agent engine 144 (e.g., as part of the indication) for analysis and those details can be sent back to the security test engine 120 for further analysis (e.g., determining, confirming, or scoring a vulnerability). In some examples, the indication and/or other information can be provided back to the security test engine 120 via the runtime agent engine 144.

In certain examples, the network sniffer engine 146 can intercept and log traffic passing over a network (e.g., a digital network) or part of a network. As data streams flow out of the AUT 142 and/or server 140 and to the network, the sniffer can capture the packets. The network sniffer engine 146 can also decode the packet's raw data to show the values of various fields (e.g., headers, payload, etc. based on multiple known protocol signatures). Further, the network sniffer engine 146 can analyze the fields to determine if a portion of the content matches the IPV(s).

In some examples, the security test engine 120 can include an audit engine (not shown) to identify vulnerabilities. Multiple audit engines can be present in the security test engine and each engine could be responsible for performing a given type of task/attack. For example, a network audit engine could be responsible for analyzing responses from the runtime agent engine 144 and flagging a vulnerability if necessary. As such, the security test engine can determine a potential AUT 142 vulnerability based on the indication of the identified IPV(s).

The network audit engine can read from associated storage and inspects all crawl requests with sensitive information and their corresponding trace responses. If a trace response includes information about the presence of network connection whose URL or content was influenced by the IPVs sent by the security test engine 120, then the network audit engine performs further analysis to determine a vulnerability. Some of the cases it may look for are as follows: detecting server-side request forgery attacks (e.g., detecting connections that originated from the AUT with tainted data (based on the scanner IPVs)), detecting tainted connections to mail servers that may be carried out by a raw socket connection to a Simple Mail Transfer Protocol (SMTP) server instead of using a mailing APIs, detecting tainted connections to backend web services, detecting tainted connections to mashups, detecting tainted connections to databases, detecting tainted connections to RESTful APIs, etc.

In certain examples, the system 100 can use a network listener (not shown) to confirm a vulnerability. The network listener is a listening device that can exist on the server 140 and can be controlled by the runtime agent engine 144. Attack payloads from the security test engine 120 can attempt to force the AUT 142 to send one or more requests to the network listener. As such, the security test engine 120 can generate an attack vector to attempt to cause the AUT to communicate with the network listener. If the attack succeeds, the network listener would receive the request. The network listener can communicate the presence of the request to the runtime agent, which can indicate or send the information to the security test engine 120.

The security test engine 120 can generate vulnerability reports. In one example, if the possible vulnerability is found because the IPV was detected using the network sniffer engine 146, the security test engine 120 can include it in the report as a possible or potential vulnerability for the AUT 142. If confirmation is received that the network listener was communicated with, the security test engine 120 can include it in the report as a confirmed vulnerability.

The engines, modules, and parts described herein can be distributed between one or more devices. The engines 120, 144, 146 include hardware and/or combinations of hardware and programming to perform functions provided herein. Moreover, modules can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the security test engine 120, application under test 142, runtime agent engine 144, and network sniffer engine 146.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules, can be included in memory. In some examples, input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the engines/modules may include, for example, hardware devices including electronic circuitry for implementing the functionality described herein. In addition or as an alternative, each module may be implemented as a series of instructions encoded on a machine-readable storage medium of computing device and executable by a processor. It should be noted that, in some embodiments, some modules are implemented as hardware devices, while other modules are implemented as executable instructions encoded on machine-readable storage media.

Figure 2:
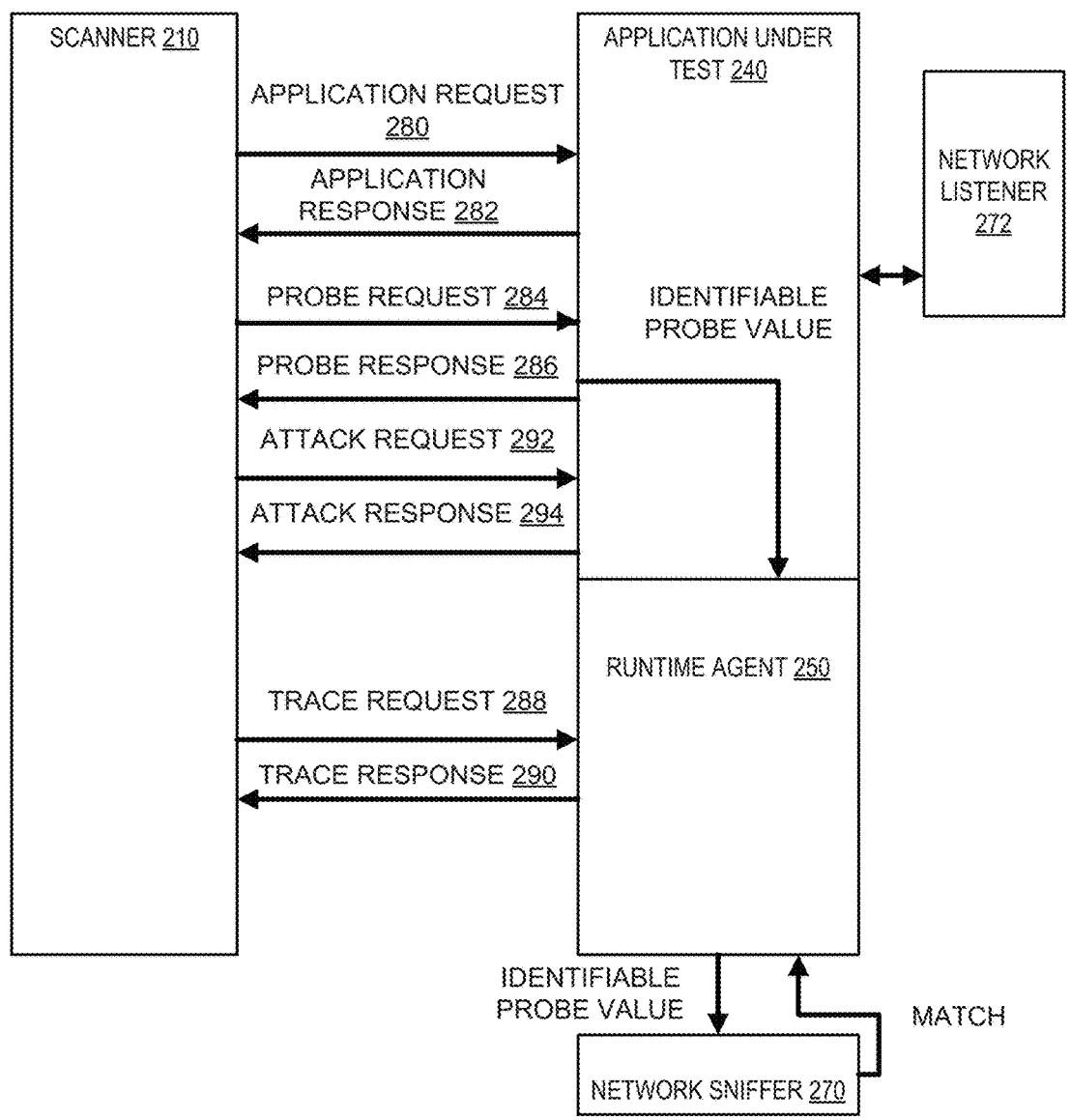
FIG. 2 is a block diagram of a computing system capable of determining a potential security vulnerability, according to one example.

FIG. 2 is a block diagram of a computing system capable of determining a potential security vulnerability, according to one example. The system 200 may include the scanner 210, the AUT 240, and the runtime agent 250. The AUT 240 may be encoded in any suitable Web-based computer language, such as JAVA, or .NET, among others. The AUT 240 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT 240 may be configured to execute one or more instances of a Java Virtual Machine (JVM), Common Language Runtime (CLR), or other runtime environment for processing requests from the scanner 210. The programming instructions provided by the common code modules of the software framework or runtime environment may be referred to as container code. Custom programming instructions specific to the AUT 240 may be referred to as user code.

The AUT 240 can include a network interface for enabling communications between the scanner 210 and the AUT 240 through a network. The network interface exposes the attack surface of the AUT 240 and can be the same interface that would eventually be used to provide access to the AUT 240 when the AUT 240 is made available for general use. Communication between the scanner 210 and the AUT 240 over the network interface may be conducted through HTTP requests issued from the scanner 210 to the AUT 240 and HTTP responses issued from the AUT 240 to the scanner 210. Requests targeting the AUT 240 may be referred to as application requests, and responses received from the AUT 240 may be referred to as application responses. The application requests generated by the scanner 210 may be configured to expose potential vulnerabilities of the AUT 240. Further, in certain examples, a network sniffer 270 can be used to monitor all communications. In some examples, the communications include the communications between the scanner 210 and AUT 240 as well as communications with other devices, for example, a database, other servers, etc.

The AUT 240 may be coupled to a file system, a database, and other resources used by the AUT 240. The file system may include data and programs used by the AUT 240, as well as data which may be requested by a user such as HTTP pages, software programs, media files, and the like. Moreover, the AUT 240 can be coupled to one or more servers, databases, etc.

The runtime agent 250 can operate within the execution environment of the AUT 240 and has access to the internal operations performed by the AUT 240. For example, the runtime agent 250, in certain examples, may modify the bytecode of the AUT 240 by injecting additional code, such as a JAVA class, at various program points. The injected code acts as a monitor that observes the AUT 240. The injected monitor code may be located at strategic program points in the AUT 240, for example, application programming interface (API) calls that perform specific operations such as reading a URL parameter or writing to the file system. Whenever such a program point in the AUT 240 is executed, the monitor calls into services provided by the runtime agent 250 to record operations performed by AUT 240. The runtime agent 250 may be coupled to a buffer for storing information that has been collected regarding the internal operations of the AUT 240. The buffer may be used to store data that has been collected but has not yet been reported to the scanner 210. The buffer may be stored in non-volatile storage medium such as a hard disk, solid state drive, and the like.

The runtime agent 250 may also include an additional network interface for enabling communications between the runtime agent 250 and the scanner 210 through the network. As noted above, both network interfaces may use the same communication channel, for example, the same HTTP channel. Communications between the scanner 210 and the runtime agent 250 may be implemented through the use of custom request and response headers. Custom headers may be added to the application requests by the scanner 210, and custom headers may be added to the application responses by the runtime agent 250. In this way, at least some of the communications between the scanner 210 and the runtime agent 250 may be piggy-backed on normal communications with the AUT 240.

The scanner 210 may also use custom request headers to generate requests that target the runtime agent 250 to obtain additional information regarding the internal processes performed by the AUT 240, or information about AUT 240, the server, the runtime agent 250, the network sniffer 270, and/or the network listener 272. Requests targeting the runtime agent 250 may be referred to as service requests, and responses received from the runtime agent 250 may be referred to as service responses. Service responses issued by the runtime agent 250 may include supplemental information in the body of the service response, as described further below.

In various examples, the runtime agent 250 is configured to receive the application requests and the service requests sent from the scanner 210 to the AUT 240. The runtime agent 250 may then analyze the header information to determine whether the request is an application request or a service request. Upon receiving an application request, the runtime agent 250 may analyze the header information to acquire data used by the runtime agent 250 regarding the specific application request. Application requests may then be delivered by the runtime agent 250 to AUT 240 for processing by the AUT 240 according to the AUT's programming. When the AUT 240 generates the application response, the runtime agent 250 may add one or more custom headers to the application response to send additional information back to the scanner 210.

In some examples, per-request headers may be custom HTTP headers that include a custom field name followed by one or more field values that are understood by the runtime agent 250 and the scanner 210. In these examples, the custom HTTP headers are ignored by the AUT 240. It will be appreciated that the field names described herein are merely used as examples of field names that could be used in a particular implementation and are not intended to limit the scope of the claims.

As noted above, for probes sent by the scanner 210, the runtime agent 250 can record various information in a buffer. The runtime agent 250 can be aware of the probe based on a per-request header. For example, the per-request header may include a memo header used to coordinate the interaction between the scanner 210 and the runtime agent 250. In some examples, the scanner 210 may add a memo header probe and/or trace request. The runtime agent 250 may use the memo header identify an attack string associated with the probe. As an example, the memo header may be formatted as follows:

X-Scan-Memo: <AttackString>/<OtherInformation>

In response to an application request for a probe/trace, the runtime agent 250 may determine the effect of the application request by determining, for example, particular lines of code that have been executed by the AUT 240, files that have been accessed by the AUT 240, database queries executed by the AUT 240, or other information. The data collected by the runtime agent 250 can be stored to a data structure, referred to herein as a "trace." In embodiments, each trace may be stored in a buffer. In some examples, the trace can include information about an IPV.

Each trace may include the Request ID of the application request and the application response that corresponds with the trace. The scanner 210 can learn about the internal operations of the AUT 240 that were triggered by a particular application request by retrieving the corresponding trace from the runtime agent 250. To retrieve a trace, the scanner 210 may issue a service request to the runtime agent 250 that includes a header field name/value pair configured to indicate the request of the trace corresponding to a particular application request or response, for example, for particular probes or sets of probes. For example, the field name/value pair for requesting a trace may be formatted as follows:

Trace=<request_id>

The value <request_id> is the value assigned by the scanner 210 or the runtime agent 250 that corresponds with the application request and/or application response associated with the requested trace. Upon receiving the trace service request, the runtime agent 250 may bypass the AUT 240 and generate a service response that includes the requested trace. In certain examples, the requested trace may be retrieved by the runtime agent 250 from the buffer and added to the body of the service response, which may then be sent to the scanner 210. Further, in some examples, the service response header includes the request_id value of the requested trace, and the body of the service response may be formatted as a JSON object.

The runtime agent 250 may maintain a plurality of traces in the buffer so that the scanner 210 can request a trace for any application request that has been made. The buffer may be of any size suitable for a particular implementation. In an example, traces stored to the buffer may be removed from the buffer in a first-in-first-out, first-in-last-out, etc. manner if the buffer becomes full.

The scanner 210 may be configured to send a separate trace service request after the corresponding application request was made and a response received from the AUT 240. The request_id enables the runtime agent 250 to receive trace requests out-of-sequence while still being able to associate the received trace with the appropriate application request and response. Trace requests may be received out-of-sequence due, in part, because the scanner 210 might have multiple threads of execution issuing application requests to the AUT 240.

In some examples, a request ID can be associated with the respective probes. Information collected about the probes can be stored in a database that may be referenced using the request ID. When a trace request arrives for a particular request ID or multiple request IDs, information about the probes (e.g., attack suggestions) can be provided.

During a security test, the scanner 210 can use application requests 280 and receive application responses 282 to communicate with the AUT 240. Application requests 280 and responses 282 can be used to crawl the attack surface of the AUT 240 as well as for other reasons. For example, an application request 280 can be used to provide information to the AUT 240 (e.g., by entering information into a field, into a URL, etc.). Various attack vectors can be performed to determine potential and confirmed vulnerabilities of the AUT 240.

During a scan of the AUT 240, probes can be used to determine whether a vulnerability exists. In particular, probes can be used to help determine whether communications to backend servers can be vulnerable. The probe can include an IPV. In some examples, the probes can be inserted into HTTP headers. For example, in the following header: HTTP://[root] [path] [parameter] [parameter], the IPV can be included in one of the parameters. Further, in some examples, extra parameters may be added during the test. As noted, the IPV can be the parameter, a part of the parameter, or identifiable based on analysis of the parameter. In other examples, the IPV(s) can be submitted via one or more fields of the AUT 240 (e.g., an email field to communicate with an email address).

A probe request 284 can provide the IPV to the AUT. A probe response 286 may be a response from the AUT 240 received due to the probe request 284. Moreover, the probe request 284 may include a service request and/or a service request can be performed disjointedly. The service request can inform the runtime agent 250 of the IPV. In some examples, a set of IPVs can be sent at a time. In other examples, the IPV can be sent for a particular probe.

The runtime agent 250 can provide the IPV to the network sniffer 270. As noted, the network sniffer 270 can monitor communications of the AUT 240. In one example, the network sniffer 270 can be implemented at a network layer. The network sniffer 270 can check one or more of the header of the communication, the payload, etc. The network sniffer 270 can look for the IPV(s) provided by the runtime agent 250 while monitoring. In some examples, the IPV(s) can be considered matching if at least a threshold number of characters is matched. In other examples, IPV(s) can be considered matched if the characters if the IPV match the contents checked by the network sniffer 270. When a match occurs, the network sniffer 270 can provide that information back to the runtime agent 250. In some examples, that information can include a copy of the packet or portion of the packet that the network sniffer 270 looked at. This can include a complete or partial part of the header and/or the payload. This information can be stored in a buffer to be sent to the scanner 210.

The scanner 210 can request a trace 288 and receive a trace response 290 including the information. In some examples, the trace response 290 may be sent by the runtime agent 250 without the request (e.g., automated based on the communication from the network sniffer).

The scanner 210 can analyze the information (e.g., header, packet, etc.) and mark the attack vector yielding the match as a potential vulnerability of the AUT.

In one example, the scanner 210 can generate an attack vector based on the potential vulnerability to attempt to hijack the communication and send to another location, for example. In this example, a network listener 272 can be implemented as the location to send the communication to. The network listener 272 can be configured so that the scanner 210 knows where the network listener 272 is. The runtime agent 250 can send the scanner 210 the location. Hijacking of the communication can be an attempt to cause the AUT 240 to communicate with the network listener 272.

This can be via an attempt for a server side request forgery attack (e.g., via a file descriptor exploitation, protocol server side request forgery (SSRF) smuggling, etc.). These can be adapted based on specific vulnerabilities such as format processing, direct sockets access (CRLF (Carriage Return and Line Feed) injection), net library URL processing (unsafe server-side redirect, etc.) such as cURL, LWP (Library for WWW in Perl), ASP.NET URI (Uniform Resource Identifier), JAVA URI, etc., external data linking, etc. As such, the scanner 210 can generate one or more attack vectors based on the particular vulnerability possibilities. The attack vector can include an attack request 292 to the AUT 240. In some examples, an attack response 294 is received. This may include information that is attempted to be gathered from the server side. However, the response is not necessary.

If the network listener 272 receives the communication, the network listener 272 can communicate, to the runtime agent 250 of the communication. In some examples, it can provide what the communication included. The runtime agent 250 can provide an indication to the scanner 210 that the communication occurred. Further, the runtime agent 250 can provide information as to what the communication was. The runtime agent 250 can network listener 272 may communicate the information based on their own initiative, or the information can be stored in respective buffers and requested via a trace request. As such, the scanner 210 can use another trace request 288 to get the information. In response, the runtime agent 250 can provide the information in a trace response. When a vulnerability is confirmed, the scanner 210 can add/modify the potential AUT vulnerability as a vulnerability or confirmed vulnerability in a vulnerability report.

Further, in some examples, the information gathered by the network sniffer 270 and runtime agent 250 can be used to expand the attack surface of the AUT 240. For example, the approaches used herein can also be used to find and determine second order connections (e.g., backend servers) of the AUT 240 to attack. This can be accomplished, for example, by initiating a port scan via the vulnerability. A port scan is an attack that sends client requests to a range of server port addresses on a host with the goal of finding an active port to exploit. In some examples, the port scan may be initiated via the network sniffer 270. In this case, the network sniffer 270 can access responses and provide that information back to the scanner 210 via the runtime agent 250.

Knowledge of a possible or confirmed vulnerability and/or class of vulnerability can be used as a starting point for additional attack vectors. Further, backend servers to pinpoint as targets can also be used to construct attack vectors. For example, knowing that a possible vulnerability exists can be used to perform additional tests other than attempting to talk to the network listener 272. These tests can be enabled on particular interfaces provided by the AUT 240 that may be vulnerable. In some examples, the attack surface can be expanded by flagging potential additional attack vectors for a user to select. In other examples, the presence of a particular kind of possible vulnerability can automatically turn on secondary attack vectors that may be geared towards expanding the attack surface and/or confirming one or more vulnerabilities.

Figure 3:
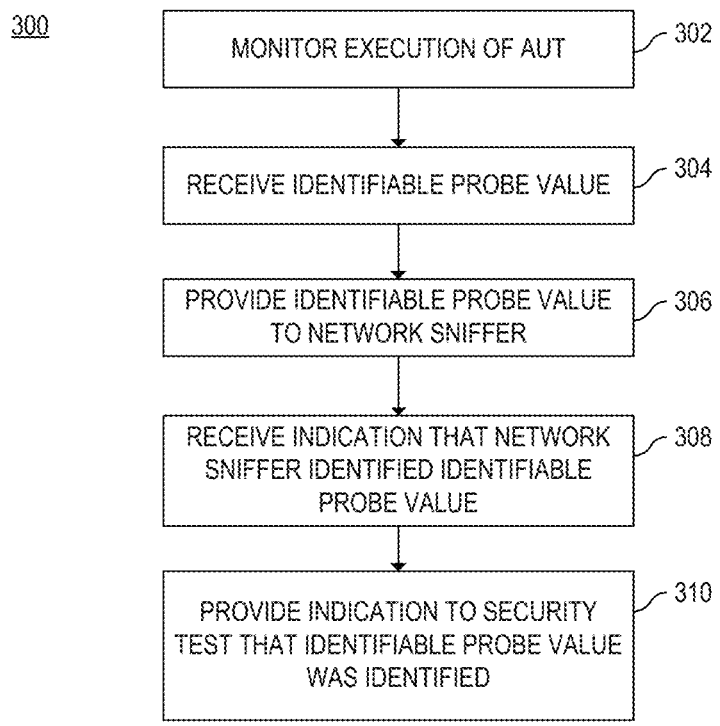
FIG. 3 is a flowchart of a method for facilitating a security test by identifying whether an identifiable probe value has been seen in a communication leaving an application under test, according to one example.
Figure 4:
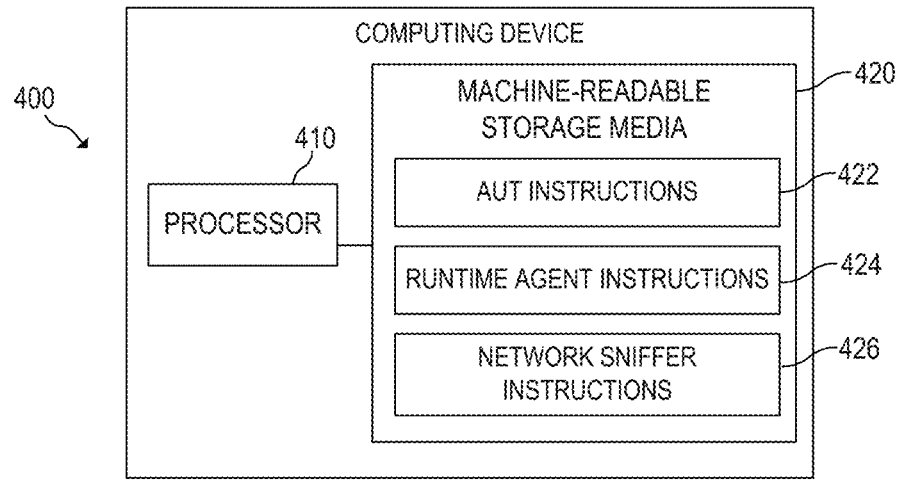
FIG. 4 is a computing device capable of facilitating a security test by identifying whether an identifiable probe value has been seen in a communication leaving an application under test, according to one example.

FIG. 3 is a flowchart of a method for facilitating a security test by identifying whether an identifiable probe value has been seen in a communication leaving an application under test, according to one example. FIG. 4 is a computing device capable of facilitating a security test by identifying whether an identifiable probe value has been seen in a communication leaving an application under test, according to one example. Although execution of method 300 is described below with reference to computing device 400, other suitable components for execution of method 300 can be utilized (e.g., computing systems 100 and/or 200). Additionally, the components for executing the method 300 may be spread among multiple devices. Method 300 may be implemented in the form of executable instructions stored on a machine-readable storage medium, such as storage medium 420, and/or in the form of electronic circuitry.

The computing device 400 includes, for example, a processor 410, and a machine-readable storage medium 420 including instructions 422, 424, 426 for facilitating a security test on an AUT. Computing device 400 may be, for example, a notebook computer, a desktop computer, a workstation, a server, or any other computing device capable of performing the functionality described herein.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for facilitating a security test. Further, in some examples, the various instructions 422, 424, 426 can be stored on different media.

At 302, runtime agent instructions 424 can be executed to monitor execution of an AUT. The AUT can be executing on the computing device 400 by execution of the AUT instructions 422. A scanner can perform a security test on the AUT.

At 304, the runtime agent can receive a notification from the security test of an IPV. The IPV can be sent to a network sniffer (306). The network sniffer can be implemented using network sniffer instructions 426 to monitor one or more external communication of the AUT. This can be at a network layer.

The network sniffer can monitor the communications to determine whether a communication includes an IPV. If the network sniffer determines that the communication matches the IPV, the network sniffer can provide such an indication to the runtime agent. The indication can include additional information, such as the packet that includes the IPV. Further, the indication may include the IPV. The runtime agent receives the indication that the network sniffer has identified the IPV (308). Further, the runtime agent can provide the indication that the network sniffer has identified the IPV to the security test (310). Multiple IPVs can be used and multiple parts of the AUT attack surface can be tested.

As noted above, the security test can include this information as a possible vulnerability. Further, the security test may confirm vulnerabilities. The confirmation process may include the runtime agent providing a location of a network listener to the security test. The security test can then generate an attack vector based on the possible vulnerability. The goal of the attack vector can be to communicate with the network listener. The attack vector can be implemented so the AUT can be attacked by the security test to communicate with the network listener. If communication is successful, the network listener can send a communication to the runtime agent indicating that the communication occurred. This can be received at the runtime agent and the runtime agent can provide the information to the security test. As noted above, the information may include other information to identify the vulnerability, communication, etc. More than one type of vulnerability can be tested and/or confirmed based on the possible vulnerability. As such, multiple attack vectors can be implemented.

Figure 5:
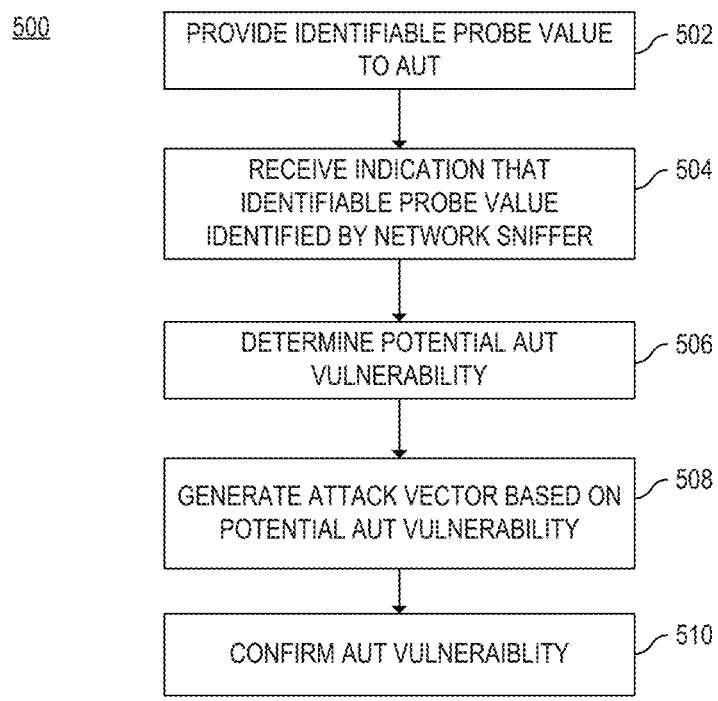
FIG. 5 is a flowchart of a method finding and confirming a vulnerability, according to one example.
Figure 6:
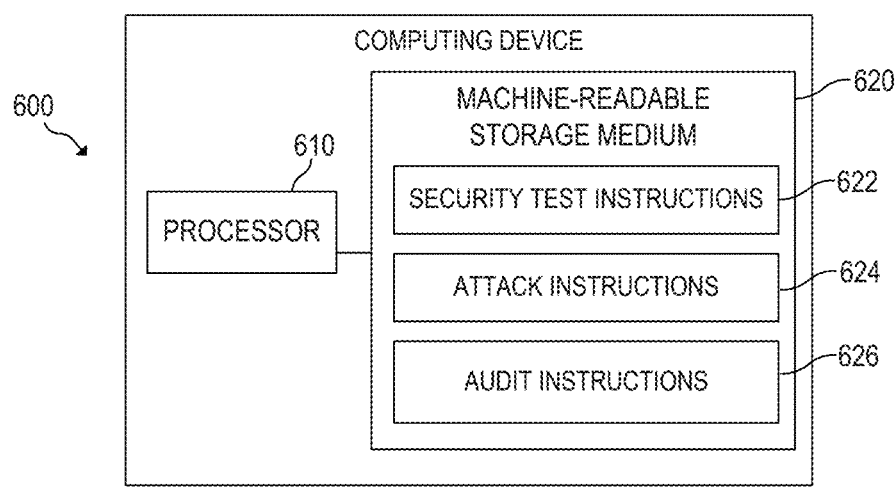
FIG. 6 is a computing device capable of finding and confirming a vulnerability, according to one example.

FIG. 5 is a flowchart of a method finding and confirming a vulnerability, according to one example. FIG. 6 is a computing device capable of finding and confirming a vulnerability, according to one example. Although execution of method 500 is described below with reference to computing device 600, other suitable components for execution of method 500 can be utilized (e.g., computing systems 100 and/or 200). Additionally, the components for executing the method 500 may be spread among multiple devices. Method 500 may be implemented in the form of executable instructions stored on a machine-readable storage medium, such as storage medium 620, and/or in the form of electronic circuitry.

The computing device 600 includes, for example, a processor 610, and a machine-readable storage medium 620 including instructions 622, 624, 626 for performing a security test on an AUT. Computing device 600 may be, for example, a notebook computer, a desktop computer, a workstation, a server, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for performing a security test.

Security test instructions 622 can be executed to test an AUT executing at a server. The security test can be implemented via a scanner as shown in FIG. 2. At 502, the security test can provide an IPV to the AUT as a probe. The IPV can be communicated to a runtime agent associated with the AUT as well. This value can be communicated to a network sniffer as discussed above. The network sniffer can determine that the IPV was communicated outside of the AUT during its monitoring. As such, the network sniffer can communicate the determination to the runtime agent, which can communicate (e.g., via a trace) the information to the security test. The security test, at 504, can receive the indication that the IPV was identified by the network sniffer. This can be used to determine a potential AUT vulnerability at 506. Audit instructions 626 can be used to determine the potential AUT vulnerability(ies). Various possible vulnerabilities can stem from the finding of the IPV based on how the IPV was communicated to the AUT and where it goes.

At 508, the computing device can execute attack instructions 624 to generate an attack vector based on the possible vulnerability. In one example, the attack can be based on a known location of a network listener associated with the runtime agent as discussed above. The attack vector can be crafted to attempt to cause the AUT to communicate with the network listener based on the formation of the communication that was matched at the network sniffer. If the network listener is communicated with, the network sniffer can inform the runtime agent and the runtime agent can inform the security test of the communication. The audit instructions 626 can be executed to confirm that an AUT vulnerability exists (510) based on the response from the runtime agent.

What is claimed is:

1. A computing system comprising:
a runtime agent engine to monitor an application under test (AUT) executing at a server during a security test;
a network sniffer engine,
wherein the runtime agent engine receives a notification from the security test of an identifiable probe value,
wherein the runtime agent engine communicates the identifiable probe value to the network sniffer engine,
wherein the network sniffer engine monitors communication traffic from the AUT,
wherein the network sniffer engine identifies the identifiable probe value,
wherein the network sniffer engine provides an indication to the runtime agent engine that the identifiable probe value was identified, and
wherein the runtime agent engine provides the indication to the security test, and wherein the security test is to determine a potential AUT vulnerability based, at least in part, on the indication.

2. The computing system of claim 1, wherein the network sniffer engine identifies the identifiable probe value in a packet, and wherein the indication includes the packet.

3. The computing system of claim 1, wherein the computing system further includes the security test, wherein the security test receives a location of a network listener, and the security test is implemented using a scanner.

4. The computing system of claim 3, wherein the computing system further generates an attack vector to attempt to cause the AUT to communicate with the network listener based on the potential AUT vulnerability.

5. The computing system of claim 4, wherein the runtime agent receives another indication that the network listener has been communicated with, and provides the other indication to the security test.

6. The computing system of claim 5, wherein the security test generates a report including the potential AUT vulnerability as a vulnerability.

7. A non-transitory machine-readable storage medium storing instructions for facilitating detection of vulnerability that, if executed by at least one processor of a computing system, cause the computing system to:
monitor, at a runtime agent, execution of an application under test executing at the device during a security test;
receive notification from the security test of an identifiable probe value;
send the identifiable probe value to a network sniffer to monitor at least one external communication of the application under test;

receive indication from the network sniffer that the network sniffer has identified the identifiable probe value; and provide indication to the security test that the network sniffer has identified the identifiable probe value.

8. The non-transitory machine-readable storage medium of claim 7, further comprising instructions that, if executed by the at least one processor, cause the computing system to:

receive a packet including the identifiable probe value from the network sniffer, wherein the at least one external communication includes the packet.

9. The non-transitory machine-readable storage medium of claim 7, further comprising instructions that, if executed by the at least one processor, cause the computing system to:

provide a location of a network listener to the security test.

10. The non-transitory machine-readable storage medium of claim 9, wherein the application under test is further attacked by the security test to communicate with the network listener.

11. The non-transitory machine-readable storage medium of claim 10, further comprising instructions that, if executed by the at least one processor, cause the computing system to:

receive another indication from the network listener that a communication occurred; and provide the other indication to the security test.

12. A method comprising:

monitoring, via a runtime agent, an application under test (AUT) executing at a server during a security test;

receiving, at the runtime agent, a notification from the security test of an identifiable probe value, communicating, by the runtime agent, the identifiable probe value to a network sniffer, wherein the network sniffer monitors communication traffic from the AUT, identifying, at the network sniffer, the identifiable probe value during the security test, providing, by the network sniffer, data to the runtime agent engine indicating that the identifiable probe value was identified, wherein the runtime agent provides the data to the security test, and wherein the security test is to determine a potential AUT vulnerability based, at least in part, on the indication.

13. The method of claim 12, wherein the identifiable probe value is included in a packet and the data also includes the packet.

14. The method of claim 12, wherein the security test is implemented via a scanner, the method further comprising:

generating, at the security test, an attack vector based on the data, wherein the attack vector attempts to communicate, via the potential AUT vulnerability, to a network listener; and implementing the attack vector.

15. The method of claim 14, further comprising:

receiving, at the network listener, communication via the implemented attack vector;

communicating the reception of the implemented attack vector back to the security test via the runtime agent; and setting the potential AUT vulnerability as a confirmed vulnerability based on the communicated reception of the implemented attack vector.

* * * * *